March 6, 1962     M. ROSENBLATT     3,024,405

HALF-WAVE MOTOR CONTROL CIRCUIT

Filed Sept. 22, 1958     3 Sheets-Sheet 1

INVENTOR
MURRAY ROSENBLATT

BY *Melvin Goldenberg*

ATTORNEY

March 6, 1962    M. ROSENBLATT    3,024,405
HALF-WAVE MOTOR CONTROL CIRCUIT
Filed Sept. 22, 1958    3 Sheets-Sheet 3

INVENTOR
MURRAY ROSENBLATT
BY Melvin Goldenberg
ATTORNEY

United States Patent Office 3,024,405
Patented Mar. 6, 1962

3,024,405
HALF-WAVE MOTOR CONTROL CIRCUIT
Murray Rosenblatt, Waynesboro, Va., assignor to General Electric Company, a corporation of New York
Filed Sept. 22, 1958, Ser. No. 762,327
12 Claims. (Cl. 318—513)

The present invention relates to speed control circuits for direct current motors and more particularly to a speed control circuit for direct current motors utilizing a saturable reactor which is reset, during alternate half cycles of an alternating current supply, to a degree dependent upon the speed of rotation of the armature of the motor.

The utilization of saturable reactors for control of motors both alternating and direct current is well established in the motor speed control art, the saturable reactors being employed to control the flow of current through the armature of the motor in response to variations in the effective impedance of the reactor which is connected in series with the motor armature. In the majority of the prior art saturable reactor controls for motors, the impedance of the reactor is varied in accordance with various predetermined parameters in the circuit, such as the counter E.M.F. of the armature which is indicative of the motor speed, speed reference signals derived from tachometer feedbacks, or other indications of loading of the motor. The circuits utilized in the prior art saturable reactor control circuits are completely adequate for controlling relatively long term variations in the motor speed but are limited in their ability to respond to sudden or transient changes since the speed of operation of the reactor is limited by the inherent characteristics of saturable reactors which require a finite length of time to respond to changes in control voltages.

In accordance with the present invention, the time required for a saturable reactor to respond to transient changes in speed of rotation of a motor armature is materially reduced below that of the prior art systems by utilizing a reset-type saturable reactor control, in which the maximum interval required for the reactor to respond to a change in conditions is equal to one-half the period of the energizing alternating current. More particularly, in a reset saturable reactor type control, when a positive excursion of the alternating current is applied across the reactor, and if it is assumed that the reactor is initially at negative saturation, the reactor presents a very high impedance in the circuit so that substantially all of the supply voltage appears across the reactor winding. When the positive excursion of the applied alternating current voltage has attained a sufficient magnitude to drive the core from negative to positive saturation, the impedance of the saturable reactor falls to substantially zero and a large current now flows through the circuit with substantially all of the applied voltage appearing across the load impedance which is normally connected in series with the reactor. During negative excursions of the applied voltage, the reactor is reset, that is, its flux density is returned towards negative saturation by a predetermined amount depending upon the degree of control required. If it is desired to effect flow of load current during an interval equal to the entire positive excursion of the applied voltage, no resetting of the core would be undertaken so that load current would start to be conducted immediately upon the supply voltage swinging positive. Also any intermediate condition of the core between positive and negative saturation may be achieved so that by appropriately resetting the core to various intermediate conditions the interval required for the positive sinusoidal voltage to attain the magnitude necessary to drive the core back to positive saturation may be controlled, thereby controlling the total load current conducted during each positive half cycle of the supply voltage.

It is a primary object of the present invention to provide a novel reset type saturable reactor control circuit for direct current motors in which the counter electromotive force across the armature of the motor is employed to determine the degree of resetting of the saturable core of the reactor during negative excursions of an applied alternating current voltage.

It is another object of the present invention to provide a novel speed control circuit for a direct current motor energized from an alternating current source in which a winding of a saturable reactor is connected in series with the motor armature and in which a reset current directly proportional to the counter electromotive force of the armature is applied through a predetermined portion of the reactor winding during negative excursions of the applied alternating voltage source.

Still another object of the present invention is to provide a novel speed control circuit for a direct current motor energized from an alternating current source utilizing a saturable reactor having a winding connected in series with the motor armature and a reset circuit connected directly across the motor armature and being rendered operative to produce resetting of the core of the saturable reactor during negative excursions of the applied voltage; the motor armature operating as a generator during the negative excursions of the applied voltage and therefore providing the necessary reset current.

A further object of the present invention is to provide a novel speed control circuit for a direct current motor energized from an alternating current source employing a saturable reactor winding connected in series with the motor armature and employing a separate reset winding for the saturable reactor which reset winding is connected in series with a speed control variable resistor directly across the armature of the direct current motor.

It is still another object of the present invention to provide a speed control circuit for direct current motors energized from an alternating current source in which a winding of a saturable reactor is connected in series with an armature of the motor and in which a reset winding of the saturable reactor is connected across the armature of the motor and further wherein a reference winding is provided for the saturable reactor, the reference winding being rendered conductive during negative excursions of the supply but applying a magnetomotive force to the core of the saturable reactor in the same direction as the magnetomotive force developed in response to the load current.

The principle of the reset, saturable reactor is employed, in accordance with the present invention, by serially connecting a saturable reactor with the armature of a D.C. motor and with an appropriately poled rectifier across an alternating current source. During negative excursions of the applied voltage, the rectifier prevents load current from flowing through the motor armature. During this interval, the counter electromotive force, which is directly proportional to speed of rotation of the armature, produces a current flow through a reset coil which is directly proportional to the counter electromotive force. Therefore, the degree of resetting of the saturable reactor is directly proportional to the motor speed and in consequence the interval during which load current is conducted, upon positive excursions of the applied voltage, is a direct function of the speed of the motor. The circuit automatically adjusts itself to starting conditions since, when the motor is initially at standstill, no counter electromotive force is developed, and therefore the saturable reactor is not reset and the armature draws load current during the entire half cycle of positive excursion of the voltage. The speed of the operation of the motor may be controlled by a variable resistor connected in series with the reset coil of the reactor since the value of such a resistor determines the current flowing in the rset circuit in response to any particular counter E.M.F. of the armature.

The subject matter which I regard as my invention is particularly pointed out and distinctly claimed in the concluding portion of this specification. My invention, however, both as to its structure and manner of operation together with further objects and advantages thereof may best be understood by reference to the following description taken in connection with the accompanying drawings in which:

Figure 1:
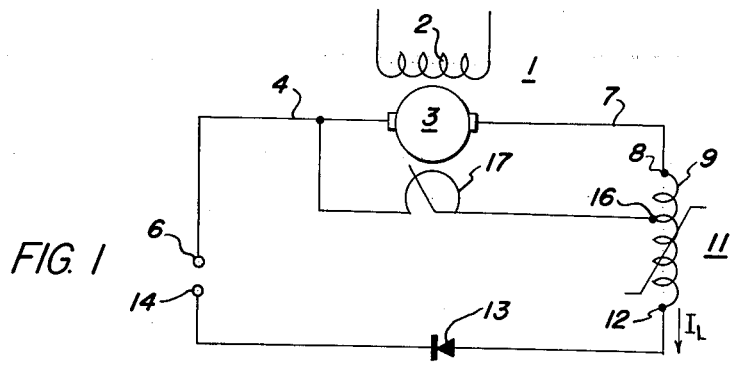
FIGURE 1 is a schematic wiring diagram of the basic speed control circuit of the present invention.

Referring specifically to FIGURE 1 of the accompanying drawings, there is provided a direct current motor 1 having a field winding 2 connected to a suitable source of direct current (not illustrated) and an armature 3 having one terminal connected via a lead 4 to a terminal 6 of a source of alternating current voltage. The other terminal of the armature 3 is connected via a lead 7 to a first end terminal 8 of a winding 9 of a saturable core reactor 11. A second end terminal 12 of the winding 9 is connected via a unilateral conducting device such as diode 13 to a second input terminal 14 of the A.C. source, the diode 13 being poled to conduct current in a direction indicated by the arrow portion of the diode symbol. The winding 9 of the saturable core reactor 11 is provided with an intermediate tap 16 which is connected via a variable resistor 17 to the lead 4. The tap 16 may be positioned at any point along the length of the winding 9 and its position is determined by the parameters of the circuit and more particularly by the available counter E.M.F. voltage at minimum adjusted speed which must produce the desired resetting of the saturable core of the reactor 11.

Figure 7:
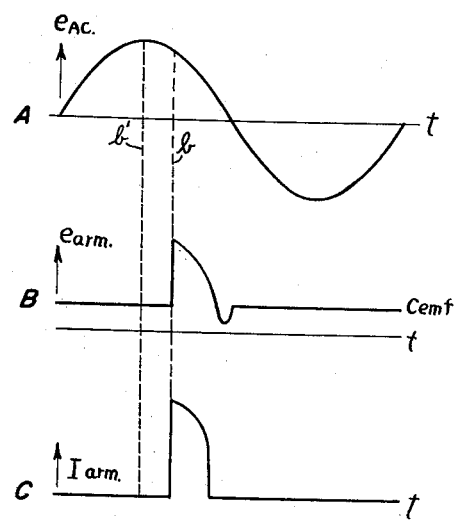
FIGURE 7 illustrates three graphs employed to explain operation of the circuit of the invention.

In the operation of the circuit illustrated in FIGURE 1, and reference is made specifically to the graphs of FIGURE 7 of the accompanying drawings, the A.C. source applies a sinusoidal voltage between the terminals 6 and 14 as indicated by Graph A of FIGURE 7. Assuming initially that the core of the saturable reactor 11 is at negative saturation and that initially the alternating voltage experiences a positive excursion; that is, the terminal 6 is rendered positive, substantially no current is conducted through the circuit due to the extremely high impedance of the saturable reactor 11. At this time, substantially all of the voltage of the circuit appears across the winding 9. When the voltage across the winding 9 becomes sufficient to drive the core of the reactor 11 to positive saturation, this being indicated by the point $b$ on the Graph B, the winding 9 of the saturable reactor 11 appears substantially as a short circuit in the circuit and therefore the applied voltage suddenly appears across the armature 3 and load current flows through the circuit. The magnitude of the load current is determined by the counter electromotive force of the armature 3, the D.C. impedance of the winding 9, which is quite small, and the impedance of the diode 13. The change in the circuit when the core of reactor 11 saturates is indicated in Graph B of FIGURE 7 by the sudden rise in voltage across the armature 3 and the rapid increase in the armature current 3 of the motor as indicated by point $b$ in Graph C of FIGURE 7.

The total energy supplied to the circuit over a positive half cycle of the input voltage is a function of both the time required for the reactor 11 to reach positive saturation and the speed of the motor. More particularly, the speed of the motor determines the magnitude of the motor load current of the motor while the time at which the core of reactor 11 saturates determines the interval during which motor load current flows. Referring again to FIGURE 7 and particularly Graphs B and C thereof, if the core of reactor 11 saturates at point $b'$ instead of point $b$, the total load current delivered during a positive half cycle of the applied voltage is greater than when saturation occurred at point $b$. In accordance with the invention, the circuit operates so that the point at which the core of reactor 11 saturates is a function of the speed of the motor. During a negative excursion of the applied alternating current voltage, the rectifier 13 blocks current flow in the circuit, and therefore the armature 3 is energized by a half-wave rectified voltage. During the period of negative excursion of the input voltage, the counter electromotive force of the armature 3 produces current flow through the variable resistor 17, the portion of the coil 9 lying between the terminals 8 and 16, and the armature itself. The current flow through the upper section of the coil 9 between the taps 8 and 16 is in a direction opposite to the direction of flow of the load current when the diode 13 is conducting and therefore develops a magnetomotive force which is opposite to that produced by the load current. Therefore, the degree of resetting of the core of reactor 11 is a direct function of the counter electromotive force of the armature and the period of conduction and in consequence the energy delivered to the armature during the subsequent positive half cycle of the applied voltage varies inversely with the speed of the armature.

Upon starting of the system, the armature is initially stationary, and substantially no counter electromotive force is developed across the armature 3 and during the negative excursions of the source substantially no current flows through the resistor 17 and the portion of the winding 9 between the taps 8 and 16. As a result, no resetting of the core of the saturable reactor 11 occurs and thus when the A.C. voltage becomes positive, load current begins to flow through the circuit immediately and maximum power is delivered to the motor assuming the reactor is positively saturated. As the speed of the motor increases, the resetting current increases, and during the negative half cycle a certain degree of resetting will occur depending upon the counter electromotive force.

Figure 8:
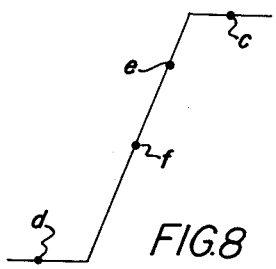
FIGURE 8 is a graph illustrating the saturation curve of the core of the saturable reactors employed in the present invention and the operation of the reset circuits on this core.

Reference is now made specifically to FIGURE 8 of the accompanying drawings which diagrammatically illustrates the saturation characteristic of the core of the reactor 11. When the point $c$ on the saturation curve is attained, the core of reactor 11 is positively saturated whereas when the point $d$ on the core is reached, the core is negatively saturated. When the motor is not turning and the core has been driven to the point $c$ by a positive excursion of the supply voltage, during a subsequent negative excursion of the supply voltage the core remains at the point $c$ since no resetting current is developed. However, as the motor increases its speed and a small counter E.M.F. is developed, the core may be reset to the point $e$ on the saturation curve so that only a short interval is required during the next positive excursion of the voltage to drive the core from the point $e$ to the point $c$. As the speed of the motor increases, the core may be reset to the point $f$ so that upon subsequent positive excursion of the applied voltage a longer period of time is required to produce positive saturation of the core; that is, to cause the saturation of the core to proceed from the point $f$ to the point $c$. When full speed of the motor is reached, the voltage across the armature may be of such a value as to produce a sufficient resetting current to drive the core from the point $c$ to the point $d$ on the saturation curve during each negative half cycle of the applied voltage and therefore the time required to cause the flux in the core to proceed from the point $d$ to the point $c$ requires a maximum interval. Thus it is seen that the speed control is completely a function of the counter E.M.F. across the armature of the motor 1 and this voltage, that is the counter E.M.F., is employed to produce the resetting current during negative half cycles of the applied voltage. The variable resistor 17 determines the reset current which can be produced by a particular value of counter electromotive force. The value of the resistor therefore determines the value of the electromotive force supplied to reset the core and consequently determnies the speed of the motor.

Figure 2:
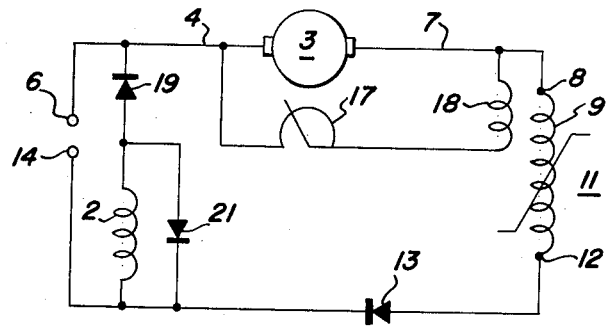
FIGURE 2 is a schematic wiring diagram of a second circuit of the invention utilizing a separate reset winding.

Referring now to FIGURE 2 of the accompanying drawings, there is illustrated a control circuit as contemplated by the apparatus of the present invention in which a separate reset coil is employed for producing resetting of the core of the saturable reactor. It will be noted that in FIGURE 1 the reset winding and the variable impedance winding of the reactor are one and the same; that is to say, the reset winding forms a portion of the impedance coil. Referring specifically to FIGURE 2, an A.C. voltage is applied across terminals 6 and 14 of the circuit, the same reference numerals being applied to all figures as are applied to FIGURE 1 where the elements are the same. The terminal 6 is connected via the lead 4 to the left side, as viewed in FIGURE 2 of the drawings, of the armature 3 of the motor. The right side of the armature is connected via the lead 7 to the variable impedance coil 9 of the saturable reactor 11. The lower end, as viewed in FIGURE 2, of the winding 9 is connected via a rectifier 13 to the input terminal 14. The lead 4 is also connected via a variable resistor 17 to the lower end of a reset winding 18 of the saturable reactor 11 which is returned at its upper end to the conductor 7.

In this embodiment of the invention, the operation is substantially identical with that of the embodiment illustrated in FIGURE 1 with the exception that a separate reset winding is employed rather than utilizing a portion of the variable impedance winding for resetting. As will appear subsequently, the utilization of the separate reset winding permits greater flexibility in the system.

Also, with respect to FIGURE 2, the motor field winding 2 is supplied by being connected in series with a unilateral conducting device such as diode 19 across the applied voltage terminals 6 and 14. The motor field 2 is shunted by a freewheeling rectifier 21, the diodes 19 and 21 being poled to conduct in opposite directions and the diode 19 being poled to conduct on negative excursions of the applied voltage; that is, when the terminal 6 is at a negative potential with respect to the terminal 14. In consequence of this arrangement, the motor field 2 is energized on negative half cycles of the applied voltage, and therefore draws current when the armature 3 is prevented from drawing current from the supply by the diode 13. The freewheeling rectifier permits flow of current through the motor field 2 during positive excursions of the applied voltage.

In the apparatus employed in FIGURES 1 and 2, the variable resistor 17 is utilized to determine the speed at which the motor is to rotate since it controls the amount of reset current for a given counter E.M.F. and therefore a given speed of the motor. If the resistor 17 is adjusted to a zero value, a relatively large reset current is produced by only a small counter E.M.F. of the motor, and therefore the motor runs at low speeds. However, if the resistor 17 is to be set to a zero value so that the motor will run at a low speed, an undesirable effect takes place. Since in both FIGURES 1 and 2 the reset circuit is in parallel with the armature, if the impedance of this circuit is small, extremely large currents are drawn therethrough (during positive excursions of the source voltage) to the detriment of the entire system and particularly may produce destruction of the components. Therefore, in the embodiments of the invention illustrated in the first two figures, the low speed range of the motor is limited by the amount of current which can be permitted to be drawn through the reset circuit and the motor must be operated at moderate speeds and upward and cannot be operated in low speed ranges without incurring damage to the apparatus.

Figure 3:
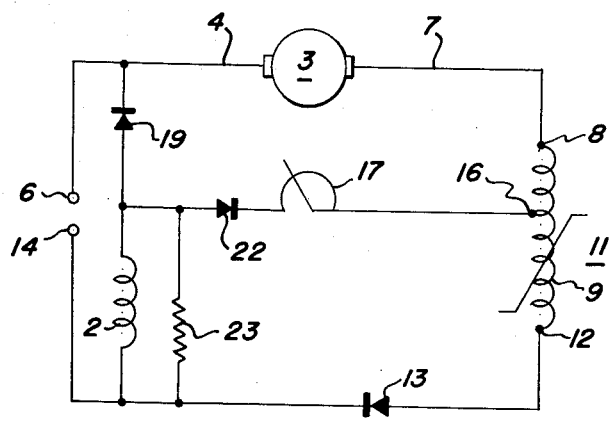
FIGURE 3 is a schematic wiring diagram of an alternative speed control circuit of the present invention in which the speed control range is extended.

Referring now specifically to FIGURE 3 of the accompanying drawings, there is illustrated an arrangement of the apparatus of the invention in which low speed ranges may be obtained. The embodiment illustrated in FIGURE 3 conforms to the basic circuit of FIGURE 1; that is, the reset winding constitutes a section of the main winding 9. One end of the speed adjusting resistor 17 is connected to the tap 16 on the coil 9 and its other end is connected to the junction of the motor field 2 and the diode 19 through a diode 22 which is poled to conduct current in a reverse direction from the load current through the portion of the coil 9 between the termnials 8 and 16. The freewheeling rectifier of FIGURE 2 is replaced by a freewheeling resistor 23; that is, the resistor 23 is connected in shunt with the field 2.

As previously indicated, the diode 19 is poled to conduct current when the terminal 6 is negative with respect to the terminal 14 and therefore during the half cycle when the armature 3 is not drawing current from the voltage supply. The impedance of the field 2 and the resistor 23 in parallel and impedance of the diode 19 determine the maximum current which flows in the field winding circuit during negative excursions of the applied voltage. It will be noted that the counter E.M.F. of the motor 3 applies a positive voltage to the cathode of the diode 19 and therefore tends to force a current through the diode 19 which is opposite in direction to the current supplying field winding 2. The diode 19 therefore serves to limit the current through the reset winding since the current flowing through the reset circuit cannot exceed the current flowing through the diode 19 as a result of conduction through the field winding 2. (The net current through diode 19 cannot reverse.) In addition, since the diode 19 is now connected in the shunt circuit around the armature 3 the reset circuit does not draw current during positive excursions of the applied voltage. The current which can be drawn through the reset circuit is now limited at all times, the diode 19 preventing current flow through the reset circuit during the positive excursions of the source and limiting the current which can be drawn through the reset circuit during negative excursions of the source to a value equal to the current drawn through the parallel combination of the field winding 2 and the resistor 23. As a result of the limiting action of the diode 19, the variable resistor 17 can be set at substantially any value from zero impedance to infinite impedance and more particularly in those ranges adjacent to zero impedance so as to permit the motor to operate in the low speed ranges. By adjusting the resistor 17 so that its impedance is very low, relatively large currents are drawn through the reset circuit in response to relatively small counter E.M.F.'s of the armature 3 and therefore at low speeds the motor can produce a substantial amount of resetting which is the criterion for maintaining the speed of the motor at any particular value. It is apparent, however, in the circuit of FIGURE 3 that at very low speeds of the motor, it would be substantially impossible to produce complete resetting of the core in the reactor 11 since sufficient voltage and therefore sufficient current is not produced by the armature at such low speeds.

Figure 4:
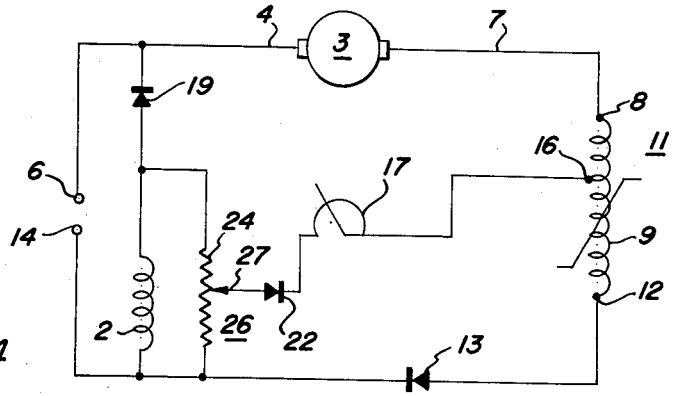
FIGURE 4 is a schematic wiring diagram of a circuit of the present invention in which a separate source of direct current voltage is employed to further extend the speed control range of the apparatus of the invention.

Referring now specifically to FIGURE 4 of the accompanying drawings there is illustrated an embodiment of the invention which further extends the low speed range of the apparatus of the invention. This embodiment of the invention is substantially identical with the embodiment of FIGURE 3 except that the freewheeling resistor 23 of FIGURE 3 is replaced by a resistance 24 of a potentiometer 26 having a variable tap 27. The variable tap 27 is connected through the diode 22 to the speed adjusting variable resistor 17. The resistor 17 in this embodiment of the invention is connected to the tap 16 on the main winding 9 of the saturable reactor, but it is apparent that in all instances a physically distinct separate reset winding may be employed.

In the operation of the circuit illustrated in FIGURE 4, a booster voltage is applied to the reset circuit, which booster voltage is added to the counter E.M.F. voltage of the motor during negative excursions of the supply voltage. More particularly, during negative excursions of the supply voltage current flows through the field winding 2 and the resistor 24 so that the variable tap 27 is at a voltage which is in series adding relationship to the counter E.M.F. of the motor. The variable tap 27 permits any portion of the voltage developed across the resistor 24 to be connected in series with the motor counter E.M.F. and as a result contributes to the control of the current flowing through the reset circuit at any particular adjustment of the variable resistor 17. Even though the motor 1 may be operating at a very low speed and the counter electromotive force across the armature 3 is quite low, the voltage tap on the resistor 24 can insure complete resetting of the core of the saturable reactor 11 and permit operation of the circuit at this low speed. Without the voltage provided by the resistor 24, the counter electromotive force across the armature 3 at such low speeds is limited in its ability to produce resetting of the reactor 11 and therefore the speed of the motor automatically increases until a value of counter electromotive force is reached which can effect complete resetting of the core.

All of the embodiments of the invention illustrated in FIGURES 1 to 4 have one basic feature in common which is that they are speed adjustors rather than speed regulators and although the speed vs. torque characteristics of the motor are far superior to an unregulated shunt motor, the characteristics still assume the general shape of the conventional shunt motor characteristics except that full starting torque is developed at zero speed whatever the setting of the speed adjustor.

Figure 9:
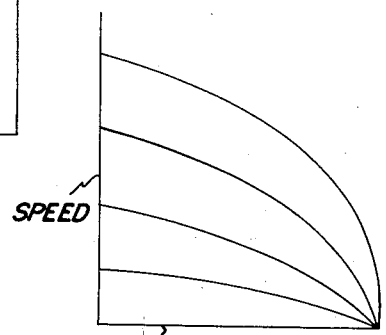
FIGURE 9 is a graph of the speed vs. torque characteristics of the motors of the circuits illustrated in FIGURES 1 through 4.

Thus, in FIGURE 9 of the accompanying drawings, there are illustrated examples of speed vs. torque characteristics of the embodiments of the invention illustrated in FIGURES 1 to 4 for different settings of the resistor 17. It will be noted that the speed vs. torque curves are different from those of a conventional shunt motor circuit, but that the basic characteristic of the motor has not been changed. The reason for the circuits of FIGURES 1 to 4 being called speed adjustors rather than speed regulators is that the circuits do not provide a reference voltage against which the counter electromotive force of the motor can be compared for purposes of control. In accordance with a further embodiment of the invention illustrated in FIGURE 5 of the accompanying drawings, there is provided a circuit which employs a speed reference so that speed regulation may be achieved. A reference reset winding is provided for the saturable reactor and provides a speed reference signal against which the speed of the motor may be compared for purposes of regulation.

Figure 5:
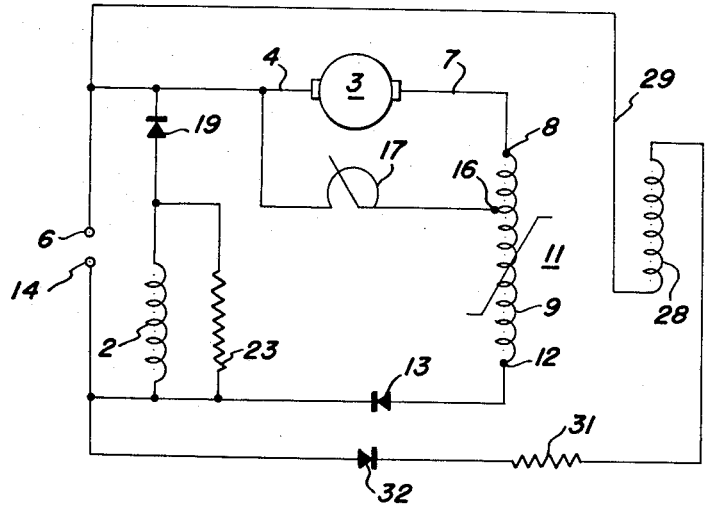
FIGURE 5 is a schematic wiring diagram of a speed control circuit of the present invention which provides for more accurate speed regulation by utilizing a reference winding on the saturable reactor.

Referring now specifically to FIGURE 5 the left side of the armature 3 is connected via the lead 4 to the terminal 6 of the applied voltage source and via a lead 7 to the terminal 8 of the winding 9 of the reactor 11. The terminal 12 of the winding 9 is connected through the diode 13 to the terminal 14 of the applied voltage source. The field winding 2 of the motor 1 is connected in series with a diode 19 across the terminals 6 and 14 and the field 2 is shunted by a freewheeling resistor 23. The speed adjusting variable resistor 17 is connected between the lead 4 and the tap 16 on the winding 9. A reference winding 28 is added to the structure of the saturable reactor 11 and has one end connected via a lead 29 to the terminal 6 of the source and has its other end connected through a reference resistor 31 to one electrode of a diode 32. The other electrode of the diode 32 is connected to the terminal 14 of the voltage source. The diode 32 is connected so that it conducts during negative excursions of the applied voltage but the winding 28 is connected in its circuit such that although current passes therethrough during negative excursions of the applied voltage, the flux produced thereby is in the same direction as the flux produced by armature current flow in the circuit of the winding 9.

In order for the reset current generated by the armature 3 to become effective to reset the core of the reactor 11, the magnetomotive force must first overcome the effects of the magnetomotive force produced by the winding 28 and therefore there is actually a comparison between the resetting magnetomotive force and the magnetomotive force produced by the winding 28, which is hereinafter referred to as a reference magnetomotive force. The amount of magnetomotive force produced by the winding 28 is determined by the parameters of its circuit and specifically by the reference resistor 31 which may be made variable so as to extend the range of the speed control of the system. In order to produce resetting of the core of the reactor 11 the current through the reset circuit as determined by the counter electromotive force of the armature and the setting of the variable resistor 17 must overcome the magnetomotive force produced by the winding 28 and the residual magnetomotive force is effective to produce reset. Since no resetting of the core is achieved until the resetting magnetomotive force overcomes the reference magnetomotive force, the response of the system is far more rapid than in the prior embodiments since maximum power is applied to the circuit whenever the motor is below speed. The full range of setting of the core of the reactor 11 is now available for controlling overspeed of the motor and permits tighter control in this range; that is, the degree of resetting of the core is a function only of overspeed.

The circuit of FIGURE 5 utilizes a portion of the variable impedance winding of the reactor 11 as a reset winding and also has the reset circuit connected directly across the motor armature. It is apparent that a separate winding may be employed as illustrated in FIGURE 2. Also, in the embodiment of the invention illustrated in FIGURE 5, the low speed ranges of the motor are limited due to the large current which would be normally drawn through the reset circuit during positive excursions of the applied voltage. In order to extend the speed range of the system, the reset circuit of FIGURES 3 or 4 may be employed.

Figure 6:
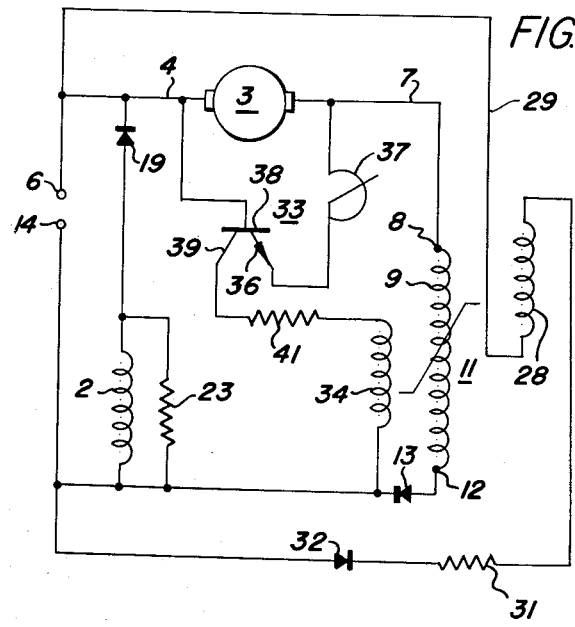
FIGURE 6 is a schematic wiring diagram of an embodiment of the present invention in which an amplified reset current is derived from the motor armature.
Figure 10:
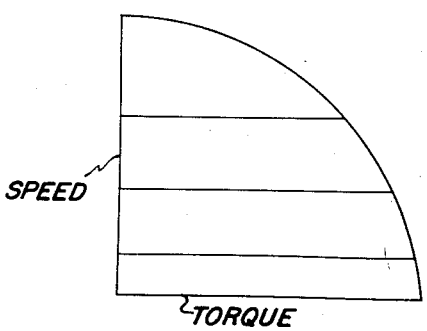
FIGURE 10 is a graph of speed vs. torque characteristics of the motors of the circuits illustrated in FIGURES 5 and 6.

In each of the embodiments of the invention thus far illustrated the current for producing reset of the saturable reactor core is derived from the generating action of the motor during those intervals when it is not receiving motoring current from the supply. Consequently, some dynamic braking occurs during each negative excursion of the signal. In accordance with a further embodiment of the invention, and reference is now made specifically to FIGURE 6 of the accompanying drawings, there is provided a control circuit in which the reset current is supplied by the main voltage source connected between terminals 6 and 14 and the speed voltage is merely employed to control the magnitude of this current. The circuit illustrated in FIGURE 6 utilizes the reference winding 28 on the reactor 11 and therefore constitutes a speed regulation system. The difference between the circuits of FIGURES 5 and 6 resides in the control of the reset function which in FIGURE 6 is accomplished by a transistor 33 driving a separate reset winding 34. More specifically, a transistor 33 of the NPN type has an emitter electrode 36 connected via a speed adjusting variable resistor 37 to the negative or righthand terminal as viewed in FIGURE 6 of the armature 3. The transistor 33 is further provided with a base electrode 38 connected to the left or positive terminal of the armature 3 and a collector electrode 39 connected through a series circuit comprising a resistor 41 and the reset winding 34 to the terminal 14 of the voltage supply. In consequence of this arrangement, during negative excursions of the applied voltage when the terminal 14 is positive with respect to the terminal 6, positive voltage is applied to the collector of the NPN transistor 33 so that the transistor is rendered conductive. The degree of conduction of the transistor 33 is controlled by the counter electromotive force of the armature 3 which is applied between the base and emitter electrodes 38 and 36, respectively, the magnitude of this signal being determined by the speed of the motor and by the setting of the variable speed resistor 37. By connecting the transistor as a common base element, a relatively large impedance is presented to the shunt circuit across the armature 3 and large variations of the resistor 37 are permissible. More particularly, the value of the resistor 37 may be reduced to a value of zero impedance without producing overloading of the shunt circuit during positive excursion of the applied voltage. In FIGURE 10 of the drawing, there are shown examples of speed vs. torque curves of the embodiments of the invention illustrated in FIGURES 5 and 6 for different settings of the resistors 17 and 37 respectively.

Although in accordance with the provisions of the patent statutes this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. A direct current motor speed control circuit comprising a direct current motor having an armature and a field, a saturable reactor having a first winding and a reset winding, a unilateral conducting device, means for connecting said armature, said first winding and said unilateral conducting device in series across a source of alternating current, and means connecting said reset winding across said armature, whereby said saturable reactor is reset substantially only in response to the counter electromotive force of said armature.

2. A direct current motor speed control circuit comprising a direct current motor having an armature and a field, a saturable reactor having a first winding and a reset winding, a unilateral conducting device, means for connecting said armature, said first winding and said unilateral conducting device in series across a source of alternating current, and means connecting said reset winding across said armature, said reset winding comprising a predetermined section of said first winding.

3. A direct current motor speed control circuit comprising a direct current motor having an armature and a field, a saturable reactor having a first winding and a reset winding, a unilateral conducting device, means for connecting said armature, said first winding and said unilateral conducting device in series across a source of alternating current, a variable resistor, and means connecting said variable resistor and said reset winding in series across said armature whereby said saturable reactor is reset substantially only in response to the counter electromotive force of said armature.

4. A direct current motor speed control circuit comprising a direct current motor having an armature and a field winding, a saturable reactor having a winding, said winding having a tap on said winding, a unilateral conducting device, means for connecting said armature, said unilateral conducting device and said reactor winding in series across a source of alternating current, a variable resistor, and means for connecting said variable resistor between said tap and an end of said armature having a counter electromotive force.

5. A direct current motor speed control circuit comprising a direct current motor having an armature and a field winding, a saturable reactor having a first winding and a separate reset winding, a unilateral conducting device, means for connecting said armature, said unilateral conducting device and said reactor winding in series across a source of alternating current, a variable resistor, and means for connecting said variable resistor and said reset winding across said armature.

6. A direct current motor speed control circuit comprising a direct current motor having an armature and a field, a saturable reactor having a first winding and a reset winding, a unilateral conducting device, means for connecting said armature, said first winding and said unilateral conducting device in series across a source of alternating current, means connecting said reset winding across said armature whereby said saturable reactor is reset in response to current flow through said armature substantially only in response to the counter electromotive force of said armature, means for preventing current flow through said reset winding during conduction of said unilateral conducting device, and means for limiting current flow through said reset winding to a predetermined value during non-conduction of said unilateral conducting device.

7. A direct current motor speed control circuit comprising a direct current motor having an armature and a field, a saturable reactor having a first winding and a reset winding, a unilateral conducting device, means for connecting said armature, said first winding and said unilateral conducting device in series across a source of alternating current, a further unilateral conducting device, means for connecting said field and said further unilateral conducting device across the source of alternating current, said further unilateral conducting device being connected so as to conduct on opposite half cycles from said first-mentioned unilateral conducting device, and means connecting said reset winding across said armature.

8. A direct current motor speed control circuit comprising a direct current motor having an armature and a field, a saturable reactor having a first winding and a reset winding, a unilateral conducting device, means for connecting said armature, said first winding and said unilateral conducting device in series across a source of alternating current, and means connecting said reset winding across said armature, said means including a source of voltage connected in additive relationship to the counter electromotive force of said armature.

9. A direct current motor speed control circuit comprising a direct current motor having an armature and a field, a saturable reactor having a first winding and a reset winding, a first unilateral conducting device, means for connecting said armature, said first winding and said first unilateral conducting device in series across a source of alternating current, a resistance, a second unilateral conducting device, means for connecting said resistance and said second unilateral conducting device across the source of alternating current, said second unilateral conducting device being connected so as to conduct on opposite half cycles from said first unilateral conducting device, a variable resistor, a third unilateral conducting device, means connecting said reset winding, said third unilateral conducting device and said variable resistor in series in a circuit, means connecting one end of said circuit to an end of said armature having a counter electromotive force and for connecting the other end of said circuit to receive a predetermined portion of the voltage across said resistance.

10. The combination according to claim 9 wherein said other end of said circuit is connected to the junction of said second unilateral conducting device and said resistance.

11. A direct current motor speed control circuit comprising a direct current motor having an armature and a field, a saturable reactor having a first winding and a reset winding, a unilateral conducting device, means for connecting said armature, said first winding and said unilateral conducting device in series across a source of alternating current, means connecting said reset winding across said armature, a reference winding for said saturable reactor for producing a magnetomotive force in the same sense as that produced by the load current through said first winding and means for energizing said reference winding during the interval of energization of said reset winding.

12. A direct current motor speed control circuit comprising a direct current motor having an armature and a field, a saturable reactor having a first winding and a reset winding, a unilateral conducting device, means for connecting said armature, said first winding and said unilateral conducting device in series across a source of alternating current, an amplifying element having a first electrode, a second electrode and a control electrode, means for connecting said first electrode, said second electrode and said reset winding in series across the alternating current source and on one side of said armature and said control electrode being conducted to a side of said armature remote from said first electrode.

References Cited in the file of this patent
UNITED STATES PATENTS

| | | |
|---|---|---|
| 2,716,726 | Lamm | Aug. 30, 1955 |
| 2,769,130 | Few | Oct. 30, 1956 |
| 2,827,606 | Kelley et al. | Mar. 18, 1958 |

UNITED STATES PATENT OFFICE
CERTIFICATE OF CORRECTION

Patent No. 3,024,405                           March 6, 1962

Murray Rosenblatt

It is hereby certified that error appears in the above numbered patent requiring correction and that the said Letters Patent should read as corrected below.

Column 5, line 29, for "determnies" read -- determines --; column 6, line 34, for "termnials" read -- terminals --; column 12, line 17, for "conducted" read -- connected --.

Signed and sealed this 21st day of August 1962.

(SEAL)
Attest:

ESTON G. JOHNSON

Attesting Officer

DAVID L. LADD

Commissioner of Patents